United States Patent [19]

Ondrejko et al.

[11] Patent Number: 5,586,875
[45] Date of Patent: Dec. 24, 1996

[54] ASSEMBLY OF ROTARY HYDRAULIC PUMPS

[75] Inventors: Richard T. Ondrejko, Highland; Paul J. Castiglione, Milford; Robert J. Miller, Livonia, all of Mich.

[73] Assignee: Ford Motor Company, Dearborn, Mich.

[21] Appl. No.: 500,376

[22] Filed: Jul. 10, 1995

[51] Int. Cl.⁶ ............................................. F01C 1/36
[52] U.S. Cl. ................................. 418/3; 417/199.1
[58] Field of Search ........................... 417/199.1; 418/3

[56] References Cited

U.S. PATENT DOCUMENTS

| | | |
|---|---|---|
| 2,989,951 | 6/1961 | Charlson . |
| 3,119,339 | 1/1964 | Clarke et al. . |
| 3,182,596 | 5/1965 | Prijatel . |
| 3,273,502 | 9/1966 | Martz . |
| 3,443,378 | 5/1969 | Monroe et al. . |
| 3,635,604 | 1/1972 | Petersen et al. . |
| 3,824,041 | 7/1974 | Rystrom . |
| 4,519,755 | 5/1985 | Hanson . |
| 4,592,706 | 6/1986 | Matsuo et al. . |
| 4,619,588 | 10/1986 | Moore, III . |
| 4,631,009 | 12/1986 | Cygnor et al. . |

FOREIGN PATENT DOCUMENTS

| | | | |
|---|---|---|---|
| 24188 | 1/1989 | Japan | 418/3 |
| 306754 | 6/1971 | U.S.S.R. . | |
| 1234889 | 6/1971 | United Kingdom . | |

*Primary Examiner*—Charles G. Freay
*Attorney, Agent, or Firm*—Frank G. McKenzie

[57] ABSTRACT

A first pump includes inner and outer intermeshing rotors, the outer rotor formed with external gear teeth. A second pump includes inner and outer meshing rotors, the outer rotor of the second pump having teeth continually engaged with the external teeth of the first pump outer rotor. The inner and outer rotors are formed with mutually intermeshing lobes that define between them pumping chambers through which hydraulic fluid is moved from a suction inlet to a pressurized outlet. A third pumping element includes pumping chambers located in the spaces between the intermeshing involute gear teeth on the outer rotors of the first and second pumps. A passage plate defines suction and pressure passages, which carry hydraulic fluid from a reservoir or sump to outlet ports, through which fluid is supplied to the hydraulic system.

9 Claims, 2 Drawing Sheets

5,586,875

ASSEMBLY OF ROTARY HYDRAULIC PUMPS

BACKGROUND OF THE INVENTION

1. Field of the Invention

This invention pertains to the field of hydraulic rotary pumps and to assemblies combining several such pumps.

2. Description of the Prior Art

An hydraulic pump includes an inlet port, which is supplied with fluid from a reservoir or other source of hydraulic fluid, an outlet port connected to a pressure line, pumping chambers to carry the fluid from inlet port to outlet port, and a mechanical drive for activating the pump chambers. In most hydraulic pumps, the pumping chambers increase in size as they rotate toward the inlet, thereby creating a partial vacuum in the chambers. The vacuum at the inlet creates a pressure difference so that fluid flows from the reservoir into the pumping chambers. The chambers then decrease in size as they rotate toward and approach the outlet in order to push fluid from the chambers into the hydraulic system.

There are many different types of pumps used to pressurize hydraulic systems. Such pumps are generally fixed, constant displacement, or adjustable displacement versions.

Cavitation is a condition that often occurs in a pump inlet and fluid is supplied at an insufficient rate to supply enough oil to keep the inlet filled. The condition produces bubbles in the hydraulic fluid, which implode as they are exposed to system pressure at the outlet of the pump. In addition to excessive pump speed, other reasons for cavitation include excess restriction in the inlet line, too low a location of the reservoir fluid below the inlet, and high viscosity of hydraulic fluid. Cavitation causes erosion of metal within the pump and increases deterioration of hydraulic fluid. A badly cavitated pump makes a very distinctive noise as the bubbles implode under pressure. One way to avoid cavitation in a pump is to maintain the pump reservoir filled with fluid to a level sufficient to fill the pump inlet.

In an automotive vehicle equipped with an engine and an automatic transmission that are arranged with their axes disposed laterally and located between the drive wheels of the vehicle, hydraulic fluid located in the sump moves under the influence of centrifugal force from side to side as the vehicle maneuvers and turns. This action causes hydraulic fluid to be removed from the pump inlet and may cause pump cavitation unless corrective action is taken.

In an automatic transmission, fluid can be drawn from the transmission sump, a receptacle located at the lowermost extremity of the transmission and moved to a reservoir located adjacent the pump inlet. To accomplish this, a scavenge pump is used to move fluid from the sump to the reservoir.

In an automatic transmission, various portions of the hydraulic control circuit have differing requirements with respect to the magnitude of pressure and flow rate of an hydraulic fluid. For example, the portion of the hydraulic circuit, through which an hydrokinetic torque converter, lubrication system, and fluid cooler are supplied, has a moderate low pressure requirement, whereas the portion of the circuit, through which a line pressure regulation and hydraulically actuated friction elements, friction clutches and brakes are supplied, has a high pressure and low flow rate requirement.

The rotary pump assembly disclosed in U.K. Patent 1,234,889 includes a Gerotor hydraulic pump having a rotor with radially directed gear teeth intermeshing with a gear wheel. Fluid is pumped from an inlet to an outlet in the space between the geared rotors.

SUMMARY OF THE INVENTION

It is an object of the present invention to provide multiple rotary hydraulic pumps, each supplying fluid to a separate portion of an hydraulic circuit of an automatic transmission, two of the pumps being Gerotor pumps having mutually driveably engaged rotors which cooperate to produce a third pump. Advantages of the present invention include the minimum number of components required to produce three hydraulic pumps, provision of a scavenging pump to avoid cavitation at the inlets of the pumps that supply hydraulic fluid to the control circuit of the transmission, and the minimal lateral dimension of the space required to contain the pumps.

A rotary pump assembly according to this invention comprises multiple pumps including a first rotary pump having an inlet port, an outlet port, a first outer rotor formed with external gear teeth and internal lobes, a first inner rotor having external lobes intermeshing with the internal lobes of the first outer rotor; a second rotary pump having an inlet port, an outlet port, a second outer rotor formed with external gear teeth meshing with the gear teeth of the first outer rotor, and internal lobes, a second inner rotor having external lobes intermeshing with the internal lobes of the second outer rotor; a gear pump having an inlet and outlet located adjacent the intermeshing gear teeth; a reservoir adapted to hold fluid in communication with the external gear teeth of the first and second outer rotors; a housing containing the first and second rotary pumps; and a passage plate defining suction and pressure passages leading to the inlet ports and outlet ports of the first and second rotary pumps and the gear pump.

The passage plate defines a first suction passage connecting an inlet port of a rotary pump and a first lateral side of a said, a second suction passage connecting an inlet port of said rotary pump and a second lateral side of said receptacle laterally opposite the first side, and suction and pressure passages leading to the inlet ports and outlet ports of the first and second rotary pumps and the gear pump.

DESCRIPTION OF THE PREFERRED EMBODIMENT

Figure 1:
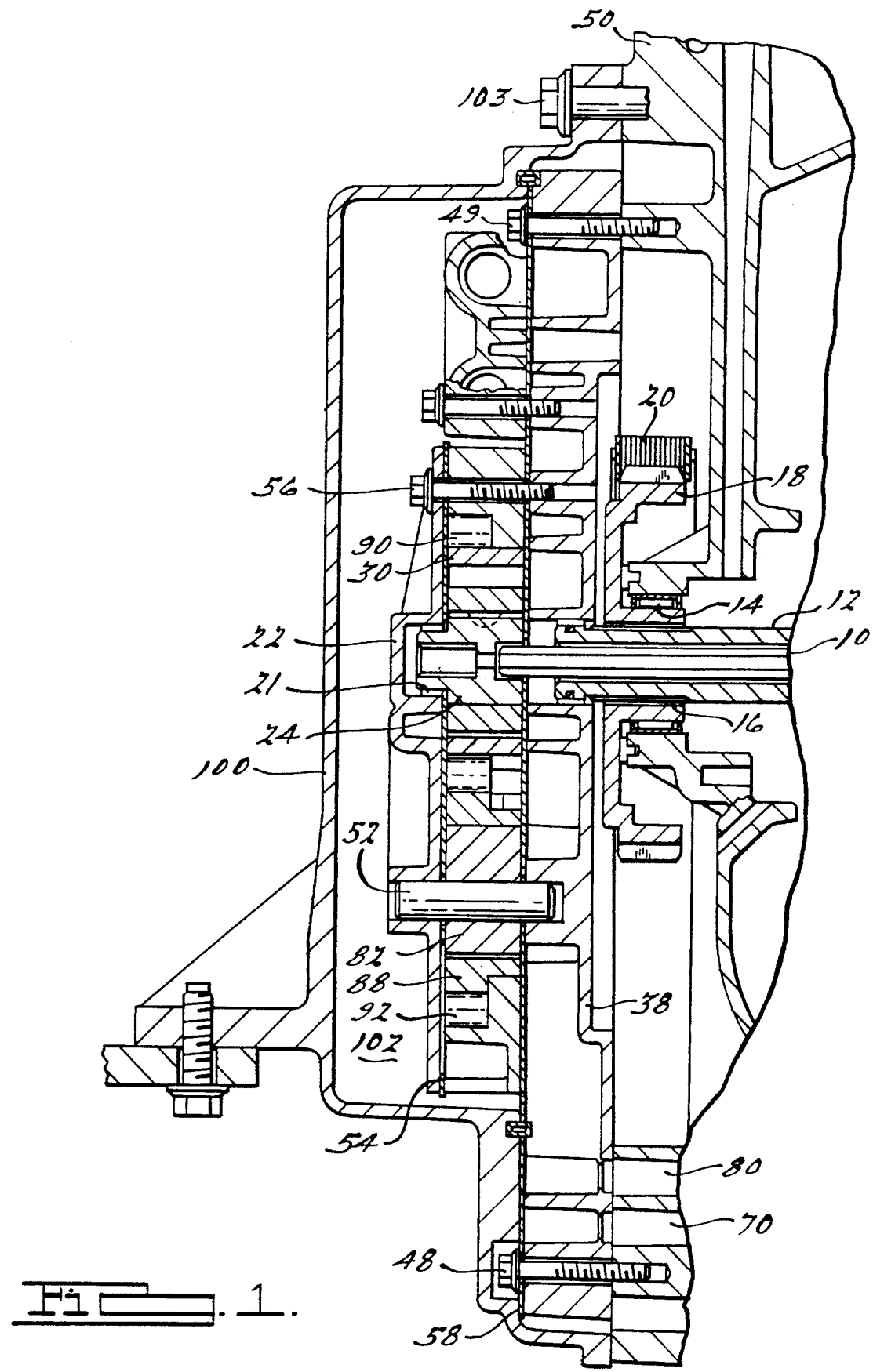
FIG. 1 is a cross section taken through a vertical plane directed parallel to the axis of an engine crankshaft and torque converter shaft.

Referring first to FIG. 1, a laterally directed crankshaft 10 of an internal combustion engine and a sleeve shaft 12 driveably connected to the turbine of an hydrokinetic torque converter, whose axis is coaxial with crankshaft 10, are supported partially on a bearing 14, the shaft 12 being connected by a spline 16 to a sprocket wheel 18, which supports a drive chain 20.

A second sprocket wheel is rotatably supported on another shaft parallel to sleeve shaft 12, and chain 20 driveably engages the teeth on the sprocket wheels, whereby power from the turbine wheel is transmitted through the chain drive mechanism to the parallel shaft. Multiple-speed planetary gears are driven from the parallel shaft.

Figure 2:
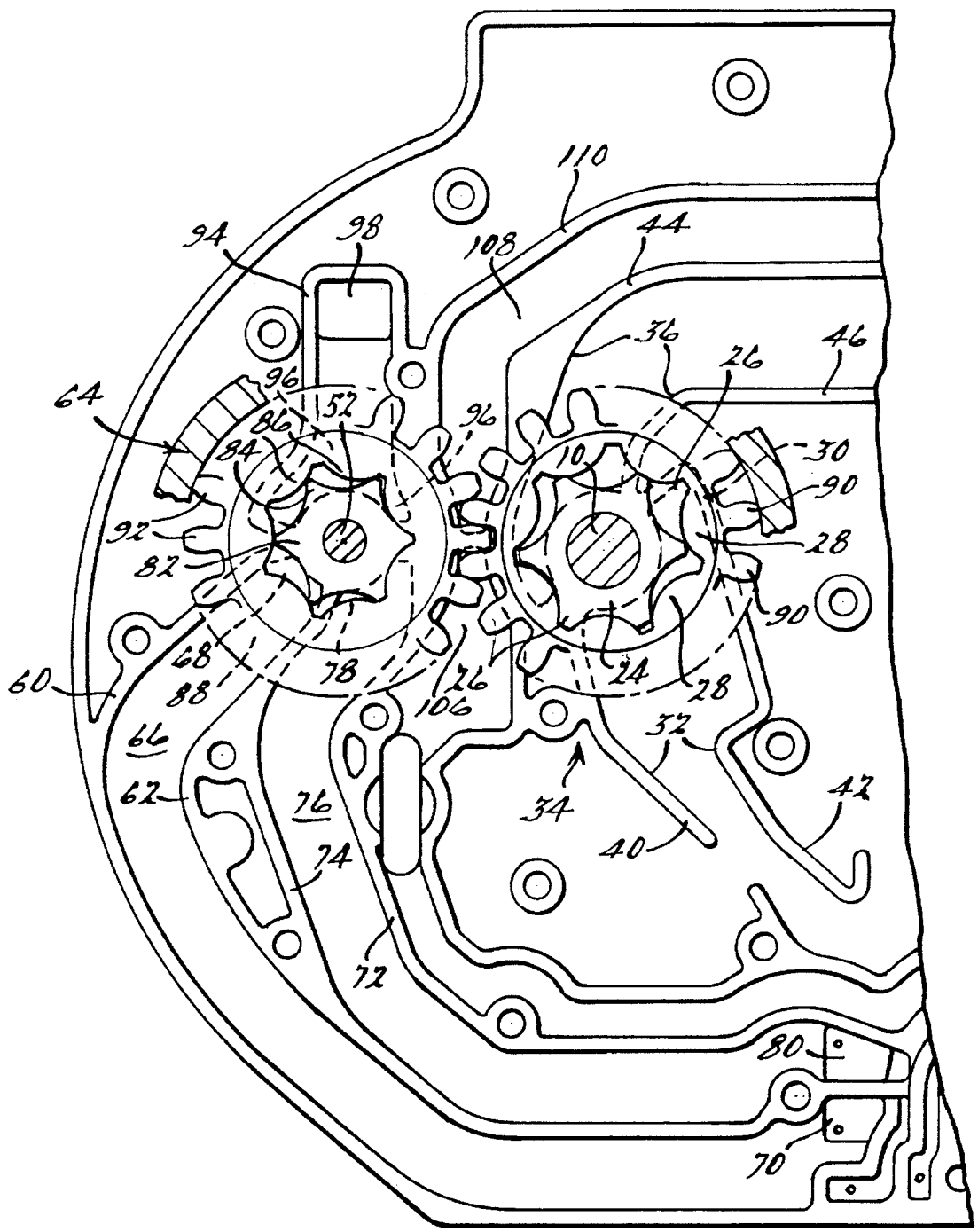
FIG. 2 is a cross section taken at plane 2—2 of FIG. 1.

The axially outer end of crankshaft 10 is supported on a bushing 21 fitted within a recess in a pump cover 22, which encloses the axially outer end of the chambers of the pump assembly of this invention. The crankshaft is mechanically fixed to a rotor 24 having six radially directed external lobes 26 (seen best in FIG. 2), which cooperate with seven radially directed inner lobes 28 formed on the internal surface of an outer rotor 30. The inner rotor 24 drives outer rotor 30 counterclockwise as viewed in FIG. 2, and together the rotors operate as a Gerotor hydraulic pump 34. Hydraulic fluid is pumped from the suction inlet 32 of pump 34 to the outlet 36.

Inlet 32 and outlet 36 are defined by passage formed in a passage plate 38 located on the axially inner side of the pump rotors. Plate 38 defines legs 40, 42, between which hydraulic fluid is carried from a relatively low pressure, supercharged source of fluid to the suction port 32 of pump 34. Other legs 44, 46 of plate 38 define passages between them that carry fluid from the outlet 36 of pump 34 to portions of the hydraulic circuit that regulate line pressure magnitude and supply fluid at regulated line pressure to the friction clutches and brakes that control operation of the planetary gearsets. Flow rate from pump 34 is relatively high.

Passage plate 38 is bolted at 48, 49 to the transmission case 50. An idler shaft 52 is fixed in position in recesses formed on the passage plate and on pump cover 22, which is bolted at 56 to passage plate 38.

A thin separator plate 54 is located between the pump cover and the axially outer faces of the pump rotors. Another thin separator plate 58 is located between the axially outer surface of passage plate 38 and the axially inner face of the pump rotors.

Passage plate 38 includes additional legs 60, 62, which extend radially from the valve body of a second Gerotor pump 64 located adjacent first pump 34. Legs 60, 62 define between them a first suction passage 66, which connects a first suction port 68 and a suction inlet 70, connected to one lateral side of the transmission sump. Passage plate 38 further includes legs 72, 74, which define between them a second suction passage 76, which hydraulically connects a second suction port 78 to a suction inlet 80, which is connected to the opposite lateral side of the transmission hydraulic fluid sump.

Second Gerotor pump 64 includes an inner rotor 82 supported rotatably on idler shaft 52 and defining six radially-directed external lobes 84, which cooperate with seven radially-directed inner lobes 86 formed on the inner surface of an outer rotor 88. The outer rotor 30 of the first pump 34 is formed with gear teeth 90, which are in continuous meshing engagement with gear teeth 92 formed on the outer surface of outer rotor 88 of the second Gerotor pump 64. Outer rotor 88 drives inner rotor 82 clockwise (as viewed in FIG. 2), due to its being driven in that direction by outer rotor 30.

Passage plate 38 further defines legs 94, which encircle the pressure outlet 96 and define a passage through which hydraulic fluid is carried to a pressure outlet port 98, which directs fluid to the low pressure reservoir 102. The space between the pump cover 22 and chain cover 100 defines reservoir 102, which is filled with fluid drawn from the transmission sump by scavenge pump 64. Chain cover 100 is sealed and bolted to the casing 50 at 103.

Passage plate 38 further includes a leg 104, which together with leg 72 defines between them a suction passage 106, through which hydraulic fluid is drawn to the suction port of the pumping elements is formed between the meshing gear teeth 90 and 92. Pressure passage 108 located between legs 44 and 110 on the pressure plate directs pressurized hydraulic fluid from the exhaust pressure side of the pumping elements located between gear teeth 90 and 92.

The spaces between the involute gear teeth on external rotors 30 and 38 are filled with fluid contained in reservoir 102. Therefore, as teeth 90 and 92 enter engagement, fluid displaced by the meshing engagement is forced from the space between teeth and is delivered at a relatively high flow rate to a secondary regulated pressure portion of the transmission hydraulic circuit, which operates at moderate pressure.

In this way, two Gerotor pumps 34 and 64 and the external rotors of those pumps define a third pump. Pump 64 draws hydraulic fluid from the dry sump of the transmission and carries that fluid to reservoir 102 from which the suction ports of the other two pumps are supplied ultimately. Pump 34 supplies pressurized hydraulic fluid to the portion of the hydraulic circuit that supplies fluid to the friction clutches and brakes at low flow rate; the other pump formed by the outer rotors 30, 88 supplies hydraulic fluid to the lubrication circuit, torque converter, and cooler at high flow rate.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A pump assembly, comprising:

a first rotary pump having
  an inlet port,
  an outlet port,
  a first outer rotor formed with external gear teeth and internal lobes,
  a first inner rotor having external lobes intermeshing with the internal lobes of the first outer rotor;

a second rotary pump having
  an inlet port,
  an outlet port,
  a second outer rotor formed with external gear teeth meshing with the gear teeth of the first outer rotor, and internal lobes,
  a second inner rotor having external lobes intermeshing with the internal lobes of the second outer rotor;

a gear pump having an inlet and outlet located adjacent the intermeshing gear teeth;

a reservoir connected to the outlet of the first rotary pump and to the inlet of the second rotary pump, and adapted to hold fluid in communication with the external gear teeth of the first and second outer rotors;

a housing containing the first and second rotary pumps; and a passage plate defining suction and pressure passages leading to the inlet ports and outlet ports of the first and second rotary pumps and the gear pump.

2. The assembly of claim 1, further comprising:

a driven shaft; and means for connecting the first rotor to the driven shaft.

3. The assembly of claim 1, further comprising;

a cover covering a first axial side of the first and second rotors, the passage plate located at the axially opposite side of the first and second rotors;

means for connecting the passage plate and cover; and an idler shaft supported on the cover and passage plate, the second rotor supported rotatably on the idler shaft.

4. The assembly of claim 1 wherein the passage plate includes:

a first suction passage connecting an inlet port of a rotary pump and a first lateral side of a receptacle adapted to contain hydraulic fluid; and a second suction passage connecting an inlet port of a rotary pump and a first lateral side of said receptacle.

5. A pump assembly for an automatic transmission having a sump receptacle adapted to contain hydraulic fluid, comprising:

a first rotary pump having
an inlet port,
an outlet port,
a first outer rotor formed with external gear teeth and internal lobes,
a first inner rotor having external lobes intermeshing with the internal lobes of the first outer rotor;

a second rotary pump having
an inlet port,
an outlet port,
a second outer rotor formed with external gear teeth meshing with the gear teeth of the first outer rotor, and internal lobes,
a second inner rotor having external lobes intermeshing with the internal lobes of the second outer rotor;

a gear pump having an inlet and outlet located adjacent the intermeshing gear teeth;

a housing containing the first and second rotary pumps;

a fluid sump; and a passage plate defining a first suction passage connecting an inlet port of a rotary pump and a first lateral side of a said sump, a second suction passage connecting an inlet port of said rotary pump and a second lateral side of said sump laterally opposite the first side, and suction and pressure passages leading to the inlet ports and outlet ports of the first and second rotary pumps and the gear pump.

6. The assembly of claim 5, further comprising:

a driven shaft; and means for connecting the first rotor to the driven shaft.

7. The assembly of claim 5, further comprising;

a cover covering a first axial side of the first and second rotors, the passage plate located at the axially opposite side of the first and second rotors;

means for connecting the passage plate and cover;

an idler shaft supported on the cover and passage plate, the second rotor supported rotatably on the idler shaft.

8. The assembly of claim 5 wherein:

the outlet port of the gear pump is connected hydraulically to a portion of a hydraulic circuit requiring relatively high flow rate, the outlet of the first rotary pump is connected hydraulically to a portion of a hydraulic circuit requiring relatively low flow rate.

9. The assembly of claim 5, further comprising a reservoir adapted to hold fluid in communication with the external gear teeth of the first and second outer rotors and wherein the outlet of the second rotary pump is connected to the reservoir.

* * * * *